Patented Aug. 12, 1952

2,606,845

UNITED STATES PATENT OFFICE 2,606,845

PROCESS FOR ADHERING POLYVINYL CHLORIDE COATINGS TO NYLON FABRIC

Howard A. Van Etten, Monroe, N. Y., assignor to E. I. du Pont de Nemours & Company, Wilmington, Del., a corporation of Delaware No Drawing. Application April 9, 1949, Serial No. 86,607

7 Claims. (Cl. 117—76)

This invention relates to improvements in coated fabrics and more particularly to coated nylon fabrics with a polyvinyl chloride surface coating firmly attached thereto.

Little affinity exists between nylon and polyvinyl chloride and heretofore the adhesion obtained between polyvinyl chloride coatings applied to nylon fabrics has been purely mechanical, i. e., the adhesion of the first coat of polyvinyl chloride coating composition applied to a nylon fabric base results from the composition striking through the fabric interstices which serves to anchor subsequently applied coats. The anchorage obtained being a function of the amount of fabric strike through.

It is a primary object of this invention to provide a polyvinyl chloride coated nylon fabric of improved anchorage of the coating to the fabric. A further object is to adhere polyvinyl chloride coatings to nylon fabric without the coating striking through the fabric interstices. Other important objects will become readily apparent as the description of the invention proceeds.

These objects are accomplished by applying a substratum of a soluble nitrogen substituted polyamide on a suitable nylon fabric base and applying directly over said polyamide a polyvinyl chloride coating composition containing a relatively high boiling ketone solvent that has a mutual solvent action on both the soluble nitrogen substituted polyamide and polyvinyl chloride.

By the term "soluble nitrogen substituted polyamides" as used through the specification is meant 80% to 95% ethanol soluble modified polyamides prepared in accordance with the teaching of U. S. Patent 2,430,860.

The adhesion of the soluble nitrogen substituted polyamide to the nylon fabric is greater than the polyvinyl chloride coating to the soluble nitrogen substituted polyamide. In the examples the adhesion referred to is that of the polyvinyl chloride to soluble nylon treated fabric and is referred to as the pounds pull required to separate the polyvinyl chloride coating from the base coated fabric. A standard test was employed for the determination of the bond between the dried polyvinyl chloride coating and the treated base fabric.

This test is described in U. S. Army Specification No. 100–48 dated May 11, 1945, section III, paragraph 6b (1).

The solvent employed for laminating specimens in all tests referred to throughout the specification was cyclohexanone.

Practically all polyamides of the nylon type, namely those of the kind described in U. S. Patents 2,071,250; 2,071,253; and 2,130,948 as well as nitrogen substituted alkoxymethyl polyamides described in U. S. Patent 2,430,860, issued November 18, 1947, to Cairns, will adhere to the nylon fabric. However, the polyvinyl chloride coating will only adhere tenaciously to the more soluble forms of the nitrogen substituted polyamides and particularly the N-alkoxymethyl polyhexamethylene adipamide in which the alkoxy radical contains 1 to 4 carbon atoms. It has also been found that the polyvinyl chloride coatings will also adhere tenaciously to the N-alkoxymethyl polyhexamethylene sebacamide.

The soluble nitrogen substituted polyamides employed in this invention are obtained by the conversion of the synthetic superpolyamides of the kind described in U. S. Patents 2,071,250; 2,071,253 and 2,130,948 known as nylons. The conversion of synthetic superpolyamides to the more soluble polymers known as alkoxymethyl polyamides is described in U. S. Patent 2,430,860 mentioned above. The reaction comprises treating the initial polyamides with formaldehyde and alcohol in the presence of an acid catalyst whereby the hydrogen of the amide groups —COHN— is replaced with the group CH$_2$OR in which the R is an alkyl radical.

The following examples are given by the way of illustration and not limitation. Throughout the specification all percentages of the various compositions are expressed on a weight basis.

*Example I*

A light weight closely woven nylon fabric having a twill weave and weighing 1.8 ounces per square yard and a minimum thread count of 80 x 86 (number of threads per inch in direction of warp and filler respectively) was coated on each side with the following composition:

| | Per cent |
|---|---|
| N-methoxymethyl polyhexamethylene adipamide | 35.0 |
| Ethanol | 45.5 |
| Water | 19.5 |

Sufficient amount of the above composition was applied to deposit approximately 0.5 ounce of non-volatile components per square yard on each side. After the volatile components were expelled from the composition by passing the coated fabric through a heat zone, the fabric was further coated on each side with the following composition.

| | Per cent |
|---|---|
| 14% solution of polyvinyl chloride in hot (100° F.–120° F.) methyl ethyl ketone | 70.0 |
| Pigment-plasticizer mill base¹ | 11.1 |
| Cyclohexanone | 18.9 |

¹ Pigment-plasticizer mill base:

| | Per cent |
|---|---|
| Colored pigments | 45.8 |
| Dibutoxyethyl phthalate | 48.4 |
| Blown castor oil | 5.8 |

Sufficient coats of the above compositions were applied on each side to deposit approximately 1 ounce per square yard of non-volatile composition on each side. The volatile solvent was expelled after each successive coat by passing the material through a heat zone.

The coated fabric was flexible, and suitable for use as military ponchos such as described in Philadelphia Quartermaster Depot Specification PQD No. 438 dated May 26, 1945. The adhesion of the coating to the fabric corresponded to 21 lbs. per two inch strip.

A control sample for Example I was prepared in the same manner as described above except a conventional plasticized solution of polyvinyl chloride of the following composition was employed in the place of the polyamide anchor coat described above:

| | Per cent |
|---|---|
| 10% solution of polyvinyl chloride in hot methyl ethyl ketone | 90 |
| Dibutoxyethyl phthalate | 10 |

The temperature of the above composition was maintained at 110° F.–130° F. during applications and contained sufficient solvent for the resin to give a very fluid composition to favor penetration of the composition into the fabric interstices. The anchorage of the dried coating to the fabric in the case of the control sample was 4 lbs. per 2" strip.

*Example II*

A nylon sail cloth weighing 7 ounces per square yard and having a thread count of 62 x 49 was coated on each side with one coat of the following composition in an amount sufficient to deposit on each side 0.5 to 1 ounce per square yard of non-volatile components:

| | Per cent |
|---|---|
| N-isobutoxymethyl polyhexamethylene adipamide | 30 |
| Ethyl alcohol | 65 |
| Water | 5 |

The volatile components were evaporated after each successive coat by passing the coated fabric through a heat zone. The fabric was further coated on each side with a composition containing polyvinyl chloride dissolved in hot methyl ethyl ketone, a pigment-plasticizer mill base as described in Example I, and cyclohexanone.

The volatile components were evaporated after each successive coat by passing the coated fabric through a heat zone. The anchorage of the dry coating to the fabric was 12 lbs. per two inch strip when tested in accordance with the method outlined above. The coated fabric was tough, flexible, waterproof and suitable for its intended use such as life raft sails, paulins, etc.

A control sample for Example II was prepared in the same manner as described above except the following composition was employed in the place of the polyamide anchor coat.

| | Per cent |
|---|---|
| 18.5% solution of a copolymer of 90 parts of vinyl chloride and 10 parts of vinyl acetate in hot methyl ethyl ketone | 83.4 |
| Dioctyl phthalate | 16.6 |

The anchorage of the dried coating to the nylon fabric was 1.5 lbs. per two inch strip.

*Example III*

A coated fabric was prepared in the same manner and employing the same coating compositions as described in Example I, the only difference being the base fabric. In this example a tightly woven oxford weave nuylon base fabric weighing 3 ounces per square yard was employed as the coating base.

The adhesion of the dried coating to the fabric was 10.3 per two inch strip.

A control sample was prepared on the same tightly woven weave nylon fabric in which the following anchor coat was employed in place of the polyamide anchor coat:

| | Per cent |
|---|---|
| 10% solution of polyvinyl chloride in hot methyl ethyl ketone | 90 |
| Dibutoxyethyl phthalate | 10 |

The adhesion of the coating to the fabric in the case of the control sample was 1 lb. per two inch strip.

*Example IV*

This example illustrates the necessity of having an active high boiling ketone solvent in the polyvinyl chloride composition in order to obtain good adhesion at the interface between the polyamide anchor coat and the polyvinyl chloride surface coating.

A coated fabric was prepared in the same manner as described in Example II, employing the same base fabric and the same polyamide anchor coat. The only difference being the cyclohexanone was omitted from the polyvinyl chloride coating composition employed in the place of that described in Example II. The formula for the polyvinyl chloride coating composition in this example is as follows:

| | Per cent |
|---|---|
| 14% solution of polyvinyl chloride in hot methyl ethyl ketone | 79.7 |
| Pigment-plasticizer mill base (same as in Example I) | 20.3 |

The dried polyamide anchor coat adhered tenaciously to the nylon base fabric, but the dried polyvinyl chloride readily separated from the polyamide coating, and the bond was so poor that the vinyl coating was easily separated from the treated base fabric.

As indicated in Example IV, it is essential that the polyvinyl chloride coatings contain a high boiling ketone solvent that has some solvent action or swelling effect on the polyamide and is an active solvent for the polyvinyl chloride. In place of the cyclohexanone which is preferred as disclosed in Examples I and II, other ketones that may be used in the polyvinyl chloride composition in the same proportion include fenchone, isophorone and dihydroisophorone.

The following soluble nitrogen substituted polyamides have been found particularly useful as intermediate bonding agents between nylon and polyvinyl chloride containing compositions:

N-methoxymethyl polyhexamethylene adipamide
N-ethoxymethyl polyhexamethylene adipamide
N-isobutoxymethyl polyhexamethylene adipamide
N-n-butoxymethyl polyhexamethylene adipamide In this list as well as in the examples, the sebacamide is the full equivalent of the corresponding adipamides and may be substituted therefor in like amount.

It will be apparent that this invention embraces the bonding of polyvinyl chloride composition and soluble nitrogen substituted polyamide compositions by incorporating specific high boiling ketone solvents in either of the compositions and allowing the solvent to evaporate while the two compositions are in intimate contact or applying the high boiling ketone to preformed films of one or both of the compositions then allowing the solvent to evaporate under conditions to bring about a unified structure.

Such a unified structure is useful in providing a laminated film in which one surface is polyvinyl chloride and the other a soluble nitrogen substituted polyamide offering the possibility of adherence of the laminated film to a much wider variety of materials than either polymer substance alone. Modification would include a cotton fabric base coated on one or both sides with a polyvinyl chloride composition and surface coated on one or both sides with a soluble nitrogen substituted polyamide. Also various textile fabrics such as cotton, nylon, glass, rayon, etc. may be base coated with polyvinyl chloride and surface coated with the soluble nitrogen substituted polyamide.

It is within the scope of the invention to pigment and plasticize the soluble nitrogen substituted polyamide coatings to obtain colored coatings with various degrees of pliability.

While the invention has been described with specific reference to adhering polyvinyl chloride coatings to nylon fabrics, it is to be understood that copolymers of vinyl chloride and other materials copolymerizable therewith can be used in place of polyvinyl chloride since these copolymers are as a rule much easier to use in laminations than polyvinyl chloride.

Among the vinyl chloride polymers that may be used in preparing the surface coating compositions of this invention are included polyvinyl chloride and copolymers of vinyl chloride obtained by polymerizing vinyl chloride in the presence of other monomers copolymerizable therewith such as the diesters of fumaric or maleic acid including dimethyl, diethyl, dipropyl and dibutyl fumarate and maleate, copolymers of vinyl chloride and esters of acrylic and alpha-chloroacrylic acid or methacrylic esters such as the methyl, ethyl, propyl esters, copolymers of vinyl chloride with vinylidene chloride and also copolymers of vinyl chloride and vinyl esters of organic acids such as vinyl acetate. These vinyl chloride copolymers and polymers can be prepared by polymerizing monomer or monomer mixtures in aqueous emulsions as is well known in the art. The polymers may be isolated from the dispersion by coagulation according to conventional methods such as by the addition of a salt solution, filtered and dried or by spray-drying the resin emulsion. In the claims the term "vinyl chloride polymer" is intended to be generic to all polymers or copolymers in which vinyl chloride is the predominant component.

There is no limitation to be placed on the plasticizer for the polyvinyl chloride. Any particular plasticizer adapted for the end product is suitable. The scope of the invention includes the use of unpigmented and unplasticized polyvinyl chloride coatings where clear stiff coatings are desired.

In commercial operations due to the higher cost of the soluble nitrogen substituted polyamides, the minimum amount is usually employed to provide a surface to which subsequently applied coats of polyvinyl chloride compositions will adhere. In the case of coating nylon base fabrics, the amount of the soluble nitrogen substituted polyamides normally employed falls within the range 0.4 to 1.5 ounces of dry coating per square yard. However, lesser or greater quantities are useful for certain applications. There is no limitation to be placed on the amount of polyvinyl chloride coating applied over the soluble polyamides since this may vary from 1 ounce or less per square yard to several ounces, i. e., 16–18 ounces or more per square yard depending upon the end use of the product.

It is apparent that many widely different embodiments of this invention may be made without departing from the spirit and scope thereof, and therefore, it is not intended to be limited except as indicated in the appended claims.

I claim:

1. The process of preparing a coated nylon fabric which comprises applying to at least one side of the said nylon fabric, sufficient dispersion of a N-alkoxymethyl polyhexamethylene amide selected from the class consisting of adipamide and sebacamide, in a volatile solvent to deposit 0.4 to 1.5 ounces of non-volatile ingredients per square yard, applying a vinyl chloride polymer coating composition dispersed in a volatile solvent, one of the said volatile solvents containing a high boiling ketone selected from the class consisting of cyclohexanone, fenchone, isophorone, and dihydroisophorone, and thereafter removing the volatile solvent, thereby forming a smooth adherent continuous vinyl chloride polymer surface film.

2. The process of claim 1 in which the N-alkoxymethyl polyhexamethylene amide is N-methoxymethyl polyhexamethylene adipamide.

3. The process of preparing a coated nylon fabric which comprises applying to at least one side of a nylon fabric an anchor coating of a dispersion in volatile solvent of the reaction product of a mixture of formaldehyde and an alcohol in the presence of an acid catalyst with a synthetic linear polyamide in which the hydrogen of the —COHN— group of the said linear polyamide is replaced with a CH₂OR group in which R is an alkyl radical, applying thereover a coating of a vinyl chloride polymer composition dispersed in volatile solvent, one of the said volatile solvents containing a high boiling ketone selected from the class consisting of cyclohexanone, fenchone, isophorone and dihydroisophrone, and thereafter volatilizing the solvent, whereby a smooth adherent continuous vinyl chloride polymer surface film is obtained, the amount of the non-volatile ingredients deposited by the said anchor coat being between 0.4 and 1.5 ounces per square yard.

4. The process of claim 3 in which the base fabric is coated on both sides with the soluble polyamide and vinyl polymer composition.

5. The process of claim 3 in which the soluble nitrogen substituted polyamide is an N-alkoxy methyl polyhexamethylene of an amide selected from the class consisting of the adipamide and sebacamide.

6. The process of claim 3 in which the nitrogen substituted polyamide is an alkoxymethyl substituted polyamide in which the alkoxy radical has from 1 to 4 carbon atoms.

7. The process of claim 3 in which the polyamide is N-methoxymethyl polyhexamethylene adipamide.

HOWARD A. VAN ETTEN.

REFERENCES CITED

The following references are of record in the file of this patent:

UNITED STATES PATENTS

| Number | Name | Date |
|---|---|---|
| 2,253,146 | Spanagel | Aug. 19, 1941 |
| 2,265,119 | Coolidge | Dec. 2, 1941 |
| 2,322,953 | Peters | June 29, 1943 |
| 2,332,373 | Dorough et al. | Oct. 19, 1943 |
| 2,443,450 | Graham et al. | June 15, 1948 |